W. H. BROWN.
Draft-Equalizer.
No. 161,476.                    Patented March 30, 1875.
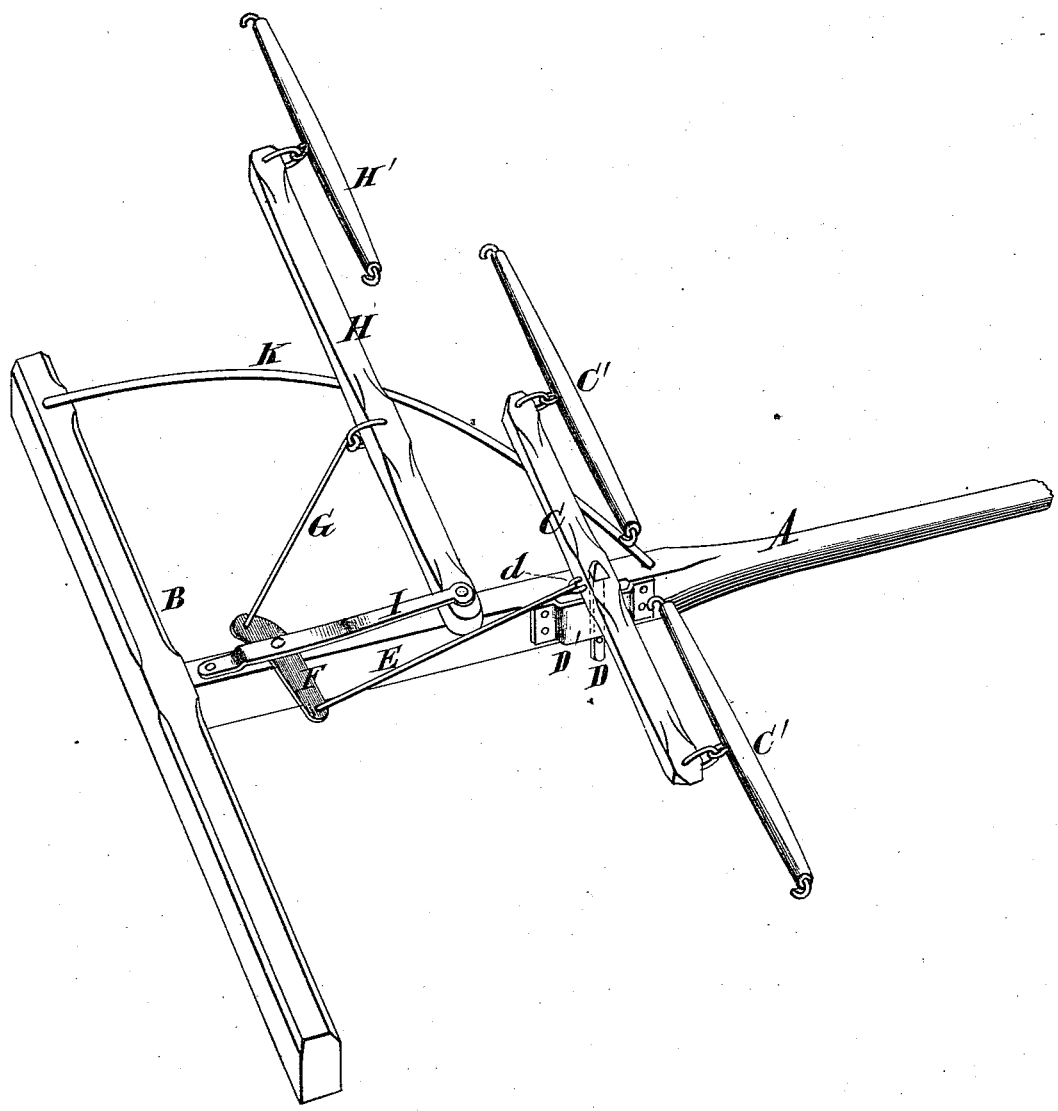
Witnesses.
A. Ruppert,
M. E. Chaffee
Wm. H. Brown
Inventor.
D. P. Holloway & Co
Attys

UNITED STATES PATENT OFFICE.

WILLIAM H. BROWN, OF LA FAYETTE, INDIANA.

IMPROVEMENT IN DRAFT-EQUALIZERS.

Specification forming part of Letters Patent No. 161,476, dated March 30, 1875; application filed January 8, 1875.

*To all whom it may concern:*

Be it known that I, WILLIAM H. BROWN, of La Fayette, in the county of Tippecanoe and State of Indiana, have invented a certain Improvement in Three-Horse Equalizers, of which the following is a specification:

The nature of my invention consists, first, in the combination, with the pole or tongue of a vehicle, of a sliding double-tree, and a lever pivoted on the pole at one end and carrying at its other end a single-tree for the attachment of the third horse, said lever being so connected to the sliding double-tree that the line of the draft will be along the line of the pole; secondly, in the employment of a curved rod running from the cross-bar of the pole to the pole proper underneath the lever to the single-tree, of which the third horse is hitched, giving support to said lever, as well as forming a brace between the pole and its cross-bar.

In the annexed drawing my improved three-horse equalizer is illustrated in perspective. The pole or tongue A carries at its inner or butt end a cross-bar, B, as usual, to be connected by suitable devices to the front axle of a vehicle. The double-tree C, carrying at either end a swiveling single-tree, C', is fixed upon the bolt D, which, instead of serving as a fulcrum-pin in the ordinary manner, acts merely as a guide in the sliding movements of the double-tree on the tongue, playing back and forth with the double-tree in a longitudinal opening, $d$, formed upon one side of the pole by the plate or loop D', bolted on the pole. The draft on the double-tree is transmitted through rod E to the long arm of lever F, fulcrumed at $f$ on the pole. The short arm of lever F is connected by rod G to the lever H at a point one-third of its length from its fulcrum-pin $h$, by means of which it is pivoted to the pole between the double-tree and lever F. A single-tree, H', is linked to the outer end of lever H for the attachment of the third horse. The arms of the levers F and H are so proportioned relatively, as to length, that the third horse will work close beside the other horses, and that the draft be equalized and be in the direction of the line of the pole. The levers F and H turn under a strap, I. K is a curved rod connecting the pole and its cross-bar upon the side of lever H, which it thus supports, besides serving as a brace.

What I claim as my invention, and desire to secure by Letters Patent, is—

1. The pole A, in combination with the sliding double-tree C, rod E, lever F, rod G, and lever H, substantially as and for the purpose specified.

2. The rod K, in combination with the lever H and the pole A and its cross-bar B, substantially as and for the purposes specified.

In testimony whereof I have signed my name to this specification in the presence of two subscribing witnesses.

W. H. BROWN.

Witnesses:
ELI N. COOPER,
JAMES N. COLE.